United States Patent
Vishlitzky et al.

(10) Patent No.: US 6,629,199 B1
(45) Date of Patent: Sep. 30, 2003

(54) DIGITAL DATA STORAGE SYSTEM INCLUDING DIRECTORY FOR EFFICIENTLY PROVIDING FORMATTING INFORMATION FOR STORED RECORDS AND UTILIZATION OF A CHECK VALUE FOR VERIFYING THAT A RECORD IS FROM A PARTICULAR STORAGE LOCATION

(75) Inventors: Natan Vishlitzky, Brookline, MA (US); Haim Kopylovitz, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/378,643

(22) Filed: Aug. 20, 1999

(51) Int. Cl.[7] ................................. G06F 12/00
(52) U.S. Cl. .................. 711/113; 711/112; 711/207; 711/208; 711/209; 714/758; 714/769
(58) Field of Search ............... 711/112, 113, 711/207, 208, 209; 714/758, 769

(56) References Cited

U.S. PATENT DOCUMENTS

| | | | |
|---|---|---|---|
| 4,698,810 A | * 10/1987 | Fukuda et al. ............... 714/758 |
| 4,792,898 A | 12/1988 | McCarthy et al. |
| 5,485,598 A | * 1/1996 | Kashima et al. ............. 711/112 |
| 5,530,948 A | * 6/1996 | Islam ......................... 711/114 |
| 5,581,723 A | * 12/1996 | Hasbun et al. ............... 711/103 |
| 5,583,876 A | * 12/1996 | Kakuta ........................ 711/114 |
| 5,617,432 A | 4/1997 | Eggenberger et al. |
| 5,719,885 A | 2/1998 | Ofer et al. |
| 5,751,937 A | * 5/1998 | Arai et al. ................... 711/114 |
| 5,802,557 A | 9/1998 | Vishlitzky et al. |
| 5,809,435 A | * 9/1998 | Yeger et al. .................... 707/1 |
| 5,848,076 A | * 12/1998 | Yoshimura ................... 714/763 |
| 5,911,779 A | * 6/1999 | Stallmo et al. ................. 714/6 |
| 5,996,046 A | * 11/1999 | Yagisawa et al. ............ 711/112 |
| 6,009,547 A | * 12/1999 | Jaquette et al. ............... 710/52 |
| 6,029,186 A | * 2/2000 | DesJardins et al. .......... 708/492 |
| 6,029,229 A | * 2/2000 | Vishlitzky .................... 711/156 |
| 6,092,231 A | * 7/2000 | Sze ............................. 714/758 |
| 6,128,760 A | * 10/2000 | Poeppleman et al. ........ 708/492 |
| 6,330,655 B1 | * 12/2001 | Vishlitzky et al. ........... 711/112 |

OTHER PUBLICATIONS

Advanced Micro Devices (AMD), AM 2960 Family Handbook, 1983, pp 36–45.*

* cited by examiner

Primary Examiner—Hong Kim
(74) Attorney, Agent, or Firm—Fish & Richardson P.C.

(57) ABSTRACT

A digital data storage system in the form of a mass storage subsystem in which information is stored on one or more disk storage units, with a storage element constituting a track on a disk storage device and each track storing a plurality of records. Each track in each disk storage device of the digital data storage system is associated with a descriptor. When the control device retrieves the contents of a record, it can process the contents to generate a check value and compare the generated check value with the check value for the record as stored in the descriptor associated with the track. If they compare appropriately, the control device can determine that the record that was retrieved was, in fact, the record that was to be retrieved. On the other hand, if they do not compare appropriately, the control device can determine that the record that was retrieved was not the proper record. If the contents of the record are updated, the control device can update the check value in the descriptor to reflect the update of the record.

6 Claims, 6 Drawing Sheets

DIGITAL DATA STORAGE SYSTEM INCLUDING DIRECTORY FOR EFFICIENTLY PROVIDING FORMATTING INFORMATION FOR STORED RECORDS AND UTILIZATION OF A CHECK VALUE FOR VERIFYING THAT A RECORD IS FROM A PARTICULAR STORAGE LOCATION

FIELD OF THE INVENTION

The invention relates generally to the field of digital computer systems and more particularly to a digital data storage subsystem including a directory for efficiently providing formatting information for records stored by the digital data storage subsystem.

BACKGROUND OF THE INVENTION

In modem "enterprise" computing environments, that is, computer systems for use in an office environment in a company, a number of personal computers, workstations, mini-computers and mainframe computers, along with other devices such as large mass storage subsystems, network printers and interfaces to the public telephony system, may be interconnected to provide an integrated environment in which information may be shared among users in the company. Typically, users may be performing a variety of operations, including order receipt, manufacturing, shipping, billing, inventory control, and other operations, in which sharing of data on a real-time basis may provide a significant advantage over, for example, maintaining separate records and attempting to later reconcile them. The users may operate on their own data, which they may maintain on the computers they are using, or alternatively they may share data through the large mass storage subsystems.

One such large mass storage subsystem is described in, for example, U.S. Pat. No. 5,206,939, entitled System And Method For Disk Mapping And Data Retrieval, issued Apr. 27, 1993 to Moshe Yanai, et al (hereinafter, "the '939 patent"), and U.S. patent application Ser. No. 07/893,509 filed Jun. 4, 1992, in the name of Moshe Yanai, et al., entitled "System And Method For Dynamically Controlling Cache Management," now U.S. Pat. No. 5,381,539, issued Jan. 10, 1995, (hereinafter, "the '539 patent") both of which are assigned to the assignee of the present invention and incorporated herein by reference. That patent and those applications generally describe an arrangement which allows data, as used by computers, organized in records, with each record being in well-known "CKD" ("count-key-data") format, to be stored in storage devices which provide a "fixed block" storage architecture. In this arrangement, a large cache is used to buffer data that is transferred from the storage devices for use by the respective computers, and, if the data has been modified, transferred back from to the storage devices for storage.

In the systems described in the aforementioned patent and patent applications, a directory table is used to provide information concerning the data that is stored in the mass storage subsystem. In one embodiment, in which the mass storage subsystem stores data on a number disk storage devices, the table includes information concerning selected characteristics of each of the CKD records stored in the mass storage subsystem, organized by device, cylinder and read/ write head or track, and includes such information as record size and certain formatting characteristics. The amount of data that can be stored by individual storage devices is continually increasing over time, both in terms of the number of cylinders that each device can store and in the amount of data each track can store, and so the amount of information which such tables needs to store can become quite large. U.S. patent application Ser. No. 08/790,642, filed: Jan. 29, 1997, in the name of Natan Vishlitzky, and entitled "Digital Data Storage Subsystem Including Directory For Efficiently Providing Formatting Information For Stored Records," now U.S. Pat. No. 6,029,229, issued Feb. 22, 2000, assigned to the assignee of the present invention and incorporated herein by reference, describes a directory table in which the amount of information required for the various records can be advantageously reduced; however, it would be helpful to further reduce the size of the directory table.

SUMMARY OF THE INVENTION

The invention provides a new and improved digital data storage subsystem including a directory for efficiently providing formatting information for records stored by the digital data storage subsystem.

In brief summary, the invention provides a digital data storage system comprising a plurality of storage elements, a memory and a control device. The storage elements are configured to retrievably store a series of records. The memory is configured to store a descriptor, the descriptor having associated with each of said records a check value. The control device is configured to, in connection with retrieval of one of said records from said storage element, use the check value associated with the one of said records in connection with verification that the one of said records actually constitutes the record that is to be retrieved.

In one embodiment, the digital data storage system is in the form of a mass storage subsystem in which information is stored on one or more disk storage units, with a storage element constituting a track on a disk storage device and each track storing a plurality of records. Each track in each disk storage device of the digital data storage system is associated with a descriptor. In that embodiment, when the control device retrieves the contents of a record, it can process the contents to generate a check value and compare the generated check value with the check value for the record as stored in the descriptor associated with the track. If they compare appropriately, the control device can determine that the record that was retrieved was, in fact, the record that was to be retrieved. On the other hand, if they do not compare appropriately, the control device can determine that the record that was retrieved was not the proper record. If the contents of the record are updated, the control device can update the check value in the descriptor to reflect the update of the record.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
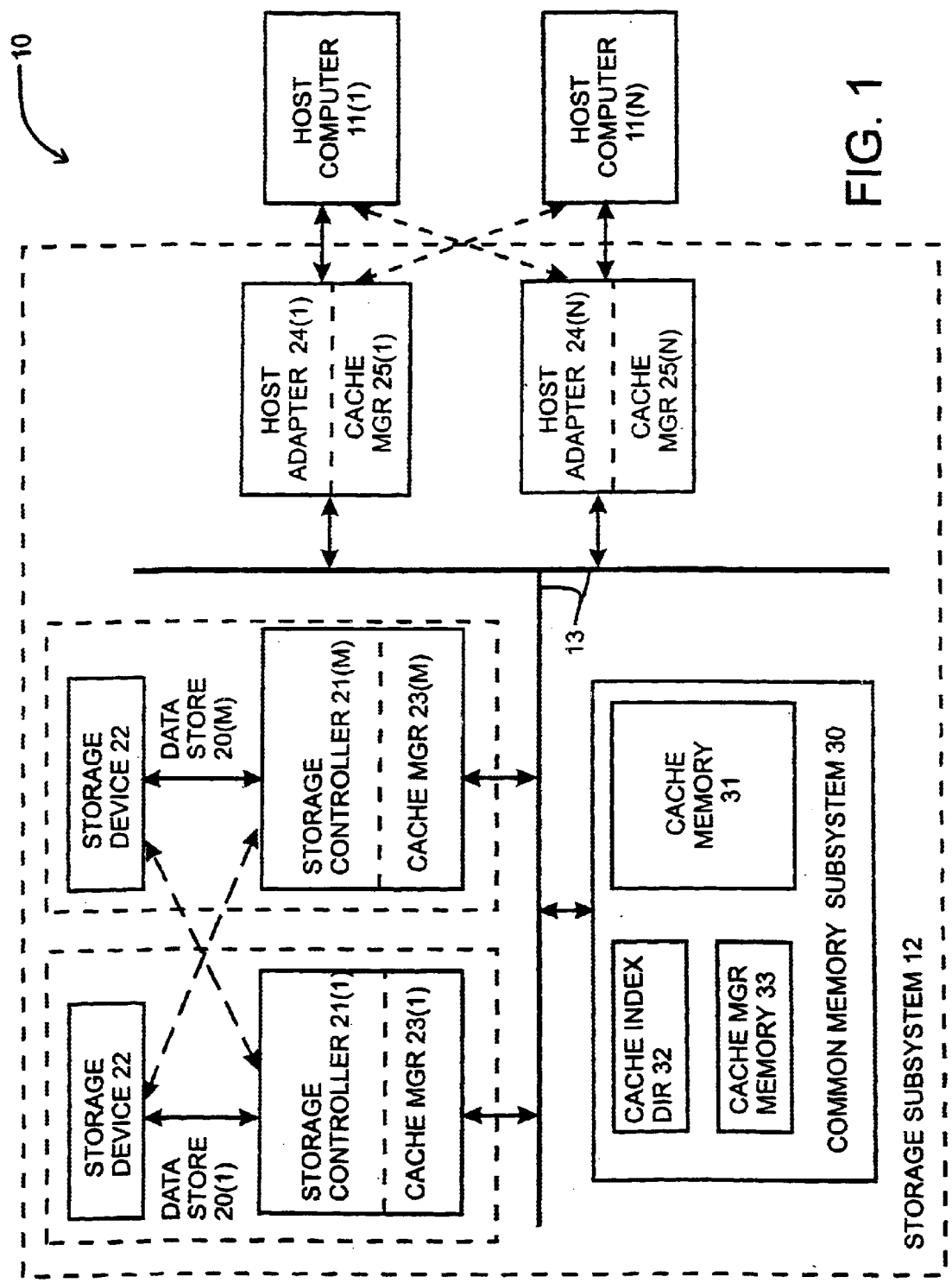
FIG. 1 is a functional block diagram of a digital computer system, including a storage subsystem constructed in accordance with the invention.

The invention will be described in connection with a digital computer system 10 depicted in functional block diagram form in FIG. 1. With reference to FIG. 1, computer system 10 includes a plurality of host computers 11(1) through 11(N) (generally identified by reference numeral 11(n)) and a digital data storage subsystem 12 interconnected by a common bus 13. Each host computer 11(n) may comprise, for example, a personal computer, workstation, or the like which may be used by a single operator, or a multi-user computer system which may be used by a number of operators. Each host computer 11(n) is connected to an associated host adapter 24(n), which, in turn, is connected to bus 13. Each host computer 11(n) may control its associated host adapter 24(n) to perform a retrieval operation, in which the host adapter 24(n) initiates retrieval of computer programs and digital data (generally, "information") from the digital data storage subsystem 12 for use by the host computer 11(n) in its processing operations. In addition, the host computer 11(n) may control its associated host adapter 24(n) to perform a storage operation in which the host adapter 24(n) initiates storage of processed data in the digital data storage subsystem 12. Generally, retrieval operations and storage operations in connection with the digital data storage subsystem 12 will collectively be referred to as "access operations."

In connection with both retrieval and storage operations, the host adapter 11(n) will transfer access operation command information, together with processed data to be stored during a storage operation, over the bus 13. Access to the bus 13 is controlled by bus access control circuitry which, in one embodiment, is integrated in the respective host adapters 24(n). The bus access control circuitry arbitrates among devices connected to the bus 13 which require access to the bus 13. In controlling access to the bus 13, the bus access control circuitry may use any of a number of known bus access arbitration techniques.

The digital data storage subsystem 12 in one embodiment is generally similar to the digital data storage subsystem described in the '939 patent. As shown in FIG. 1, the digital data storage subsystem 12 includes a plurality of digital data stores 20(1) through 20(M) (generally identified by reference numeral 20(m)), each of which is also connected to bus 13. Each of the data stores 20(m) stores information, including programs and data, which may be accessed by the host computers 11(n) as well as processed data provided to the digital data storage subsystem 12 by the host computers 11(n).

Each data store 20(m), in turn, includes a storage controller 21(m) and one or more storage devices generally identified by reference numeral 22. The storage devices 22 may comprise any of the conventional magnetic disk and tape storage devices, as well as optical disk storage devices and CD-ROM devices from which information may be retrieved. Each storage controller 21(m) connects to bus 13 and controls the storage of information which it receives thereover in the storage devices connected thereto. In addition, each storage controller 21(m) controls the retrieval of information from the storage devices 22 which are connected thereto for transmission over bus 13, and in one embodiment includes bus access control circuitry for controlling access to bus 13.

The digital data storage subsystem 12 also includes a common memory subsystem 30 for caching information during an access operation and event status information providing selected status information concerning the status of the host computers 11(n) and the data stores 20(m) at certain points in their operations. The caching of event status information by the common memory subsystem 30 is described in detail in U.S. patent application Ser. No. 08/532,240, filed Sep. 22, 1995, in the name of Eli Shagam, et al., and entitled Digital Computer System Including Common Event Log For Logging Event Information Generated By A Plurality of Devices, assigned to the assignee of the present invention and incorporated herein by reference. The information cached by the common memory subsystem 30 during an access operation includes data provided by a host computer 11(n) to be stored on a data store 20(m) during a storage operation, as well as data provided by a data store 20(m) to be retrieved by a host computer 11(n) during a retrieval operation. The common memory subsystem 30 effectively operates as a buffer to buffer.information transferred between the host computers and the data stores 20(m) during an access operation.

The common memory subsystem 30 includes a cache memory 31, a cache index directory 32 and a cache manager 33, which are generally described in U.S. patent application Ser. No. 07/893,509 filed Jun. 4, 1995, in the name of Moshe Yanai, et al., entitled "System And Method For Dynamically Controlling Cache Management," assigned to the assignee of the present invention and incorporated herein by reference. The cache memory 31 operates as a buffer in connection with storage and retrieval operations, in particular buffering data received from the host computers 11(n) to be transferred to the storage devices for storage, and buffering data received from the data stores 20(m) to be transferred to the host computers 11(n) for processing.

Figure 2:
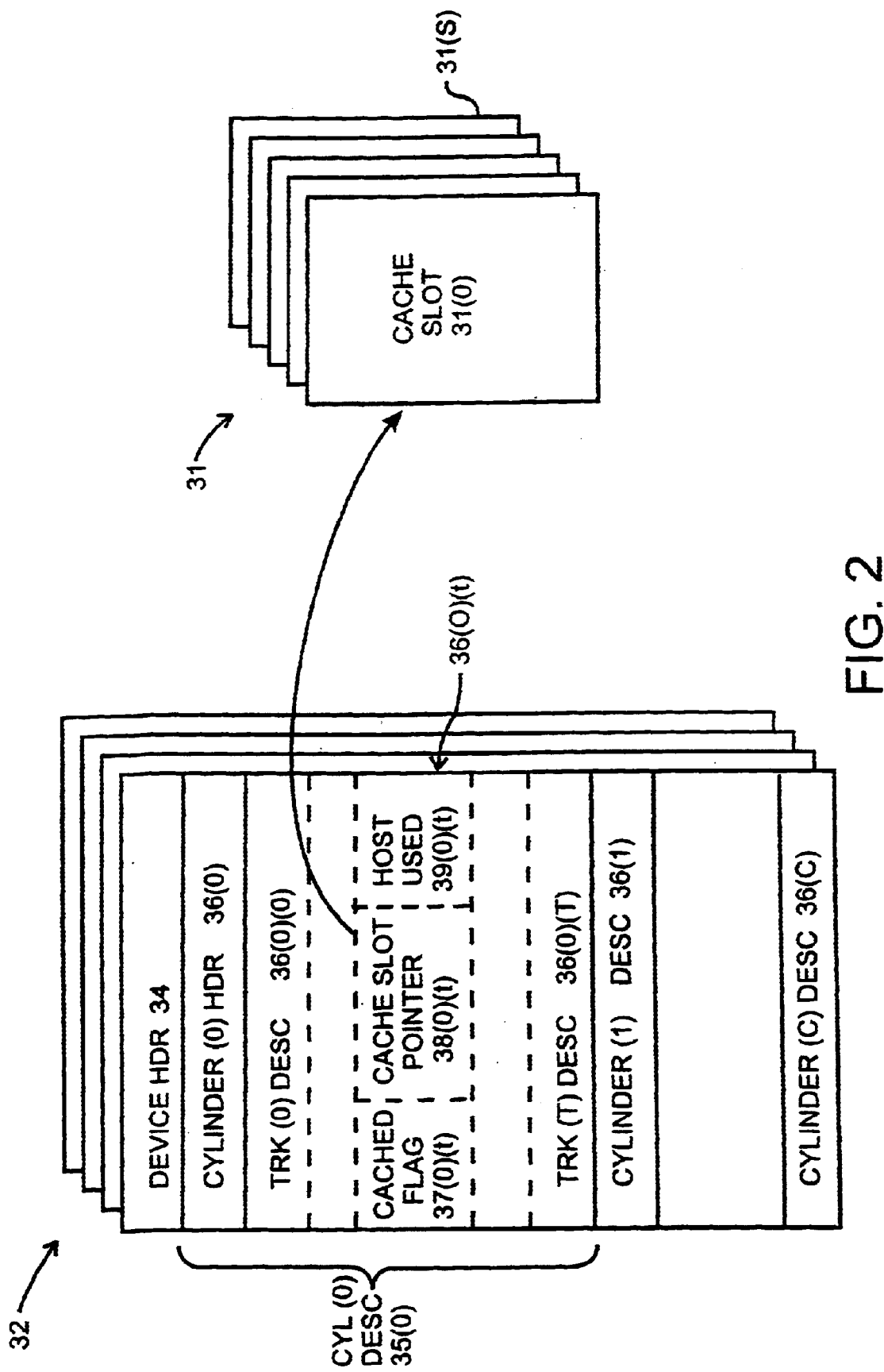
FIG. 2 depicts the organization of a cache memory and cache index directory useful in understanding the operation of the storage subsystem depicted in FIG. 1.

The cache memory 31 and cache index directory 32 will generally be described in connection with FIG. 2. With reference to FIG. 2, the cache memory 31 includes a series of storage locations, which are organized in a series of cache slots 31(0) through 31(S) (generally identified by reference numeral 31(s)). The storage locations are, in turn, identified by a series of addresses, with the starting address of a cache slot being identified by a base address. The cache slots 31(s), in turn, operate as the cache memory's buffer as described above.

The cache index directory 32 operates as an index for the cache slots 31(s) in the cache memory 31. The cache index directory 32 includes a plurality of cache index tables 32(0) through 32(D) (generally identified by reference numeral 32(d)), each of which is associated with one of the storage devices 22 in the storage subsystem 12. Each cache index table 32(d) includes a device header field 34, which provides, for example, selected identification and status information for the device 22 associated with the cache index table 32(d). In addition, each cache index table 32(d) includes a plurality of cylinder descriptors 35(1) through 35(C) (generally identified by reference numeral 35(c)) each of which is associated with one of the cylinders in the storage device 22 that is associated with the cache index table 32(d). Each cylinder descriptor 35(c), in turn, includes a cylinder header 36(c), which provides, for example, selected identification and status information for the cylinder associated with the cylinder descriptor 35(c).

In addition, each cylinder descriptor 35(c) includes a plurality of track descriptors 35(c)(0) through 35(c)(T) (generally identified by reference numeral 35(t)), each of which is associated with one of the tracks in the cylinder 35(c). Each track descriptor 35(c)(t), in turn, includes information for the associated track of the storage device 22, including whether a copy of the data stored on the track is cached in the cache memory 31, and, if so, the identification of the cache slot 31(s) in which the data is cached. In one embodiment, each track descriptor 35(c)(t) includes a cached flag 37(c)(t) and a cache slot pointer 38(s)(t). The cached flag 37(c)(t), if set, indicates that the data on the track associated with the track is cached in a cache slot 31(s), and the cache slot pointer 38(s)(t) identifies the particular cache slot in which the data is cached. In addition, each track descriptor 35(c)(t) includes a used flag 39(c)(t) which may be used to indicate whether the data, after being stored in the cache slot identified by the cache slot pointer 38(c)(t), has been used by the host computer 11(n) during a retrieval operation. This "host used" flag may be used to determine whether the cache slot may be re-used for another access operation.

Each of the host adapters 24(n) and each of the device controllers 21(m) includes a cache manager 16(n) and 23(m), respectively, to access to the cache memory 31, cache index directory 32 and cache manager memory 33. The particular operations performed during an access operation will depend on a number of factors, including the access operation to be performed, whether or not the data from the particular track to be accessed is cached in the cache memory 31, and whether or not the data contained in a cache slot 31(s) has been modified or updated by a host adapter's cache manager 16(n) during a storage operation. As described in the aforementioned Shagam application, the host adapters 24(n) typically perform storage and retrieval operations in connection with data in the cache memory 31, and the device controllers 21(m) perform "staging" and "de-staging" operations to transfer data in the storage devices 22 to the cache memory 31 for buffering (the staging operations) and to transfer data from the cache memory 31 to the storage devices 22 for storage (the de-staging operations). In performing the staging and de-staging operations, the device controllers 21(m) generally transfer data to and from the cache memory 31 in units of a track, that is, they will during a staging operation transfer all of the data in a track from a storage device 22 to a cache slot 31(s) in the cache memory 31, and during a de-staging operation copy all of the data in a slot in the cache memory 31 to the track of the storage device 22 from which it was originally staged.

The cache manager memory 33 maintains a number of work lists which are used to control operations by the host adapters 24(n) and storage controllers 21(m) during an access operation. In particular, the cache manager memory 33 includes a cache slot replacement list, a pending write list and various lists which the host adapters 24(n) and storage controllers 21(m) use to communicate to coordinate staging operations (not shown). It will be appreciated that the various lists maintained by the cache manager memory 33 may comprise any of a number of convenient forms, including queues, trees, stacks or the like. The cache slot replacement list is used to control re-use of cache slots during staging operations in accordance with a convenient cache-slot re-use methodology. During a staging operation, the storage controller's cache manager 23(m) uses the cache slot replacement list to select a cache slot 31(s) into which it will load the data retrieved from a storage device. (The aforementioned Shagam application describes a modified least-recently-used cache-slot re-use methodology used in one embodiment of the invention). The pending write list is used to identify cache slots 31(s) which contain updated data, which has not been written to a storage device. During de-staging operations, the storage controllers' cache managers 23(m) will use the write pending list to identify cache slots to be written to a storage device 22. Preferably, the cache slots 31(s) which are identified in the pending write list will not also be listed in the cache slot replacement list, so that cache slots 31(s) which contain updated data will not be used until the data has not been written to a storage device through a de-staging operation.

The staging operation coordination communication lists include a plurality of stage request lists and a plurality of stage completion lists, with one stage request list being associated with each data store 20(m) and one stage completion list being associated with each host computer 11(n). The host adapters' cache managers 16(m) use the stage request lists to store stage requests to be performed by the respective data stores 20(m), and the data stores' cache managers 23(n) use the stage completion lists to store stage completion messages to indicate to the respective host adapters' cache managers 16(m) that the stage requests have been completed.

Generally, a host adapter 24(n), during a retrieval operation, attempts to retrieve the data from the cache memory 31. However, if the data is not in the cache memory 31, it will enable the device controller 21(m) which controls the storage device 22 that contains the data to be retrieved to "stage" the track which contains the data to be retrieved, that is, to transfer all of the data in the track which contains the data to be retrieved into a slot in the cache memory 31. After the data to be retrieved is in a slot in the cache memory 31, the host adapter 24(n) will retrieve the data from the slot. Similarly, during a storage operation, the host adapter 24(n) will determine whether the particular track into which the data is to be written is in a slot in the cache memory 31 and if so will store the data in the slot. However, if the data is not in the cache memory 31, the host adapter 24(n) will enable the cache manager 23(m) and storage controller 21(m) which controls the storage device 22 that contains the track whose data is to be updated to perform a staging operation in connection with the track, thereby to transfer the data in the track into a slot in the cache memory 31. After the data from the track has been copied into the cache memory 31, the host adapter 24(n) will update the data in the track.

The storage controller 21(m) generally attempts to perform a staging operation in connection with an empty slot in the cache memory 31. However, if the storage controller 21(m) may find that all of the cache slots in the cache memory 31 are filled, it will in any case select one of the slots to be used with the staging operation. Before transferring the data from the track to the selected cache slot, it will determine whether the data in the slot has been updated by a storage operation, and if so copy the data to the storage device 22 in a de-staging operation, and thereafter perform a staging operation to copy the data from the storage device to the selected cache slot. It will be appreciated that the storage controller 21(m) need only perform a de-staging operation in connection with a cache slot if the data in the cache slot has been updated, since if the data in the cache slot not been updated before the slot is re-used (which may occur if the host adapter 24(n) has only performed retrieval operations therewith), the data in the cache slot corresponds to the data in the storage device 22.

More specifically, as described in the aforementioned Shagam application, during a retrieval operation, the cache manager 16(*n*) of the initiating host adapter 24(*n*) will initially access the cache index table 32(*d*) in the cache index directory 32 associated with the storage device 22 in which the data to be retrieved is stored, in particular accessing the track descriptor 36(*c*)(*t*) of the cylinder descriptor 36(*c*) to determine, from the condition of the cached flag 37(*c*)(*t*), whether the data from the track is cached in a cache slot 31(*s*) in the cache memory. If the cached flag 37(*c*)(*t*) indicates that data from the track is cached in a cache slot 31(*s*), the cache manager 16(*n*) uses the cache slot pointer 38(*t*) to identify the particular cache slot 31(*s*) in which the data is cached and retrieves the required data from the cache slot 31(*s*).

On the other hand, if the cache manager 16(*n*) determines from the cached flag 37(*c*)(*t*) that the data from the track is not cached in a cache slot 31(*s*), it will generate a stage request to enable the storage controller 21(*m*) for the storage device 22 which maintains the data to be retrieved, load the stage request in the stage request queue for the data store 21(*m*) and notify the storage controller 21(*m*) that a stage request had been loaded in the stage request queue. At some point after receiving the notification, the, storage controller 21(*m*) will retrieve the stage request and perform a staging operation in response thereto. In performing the staging operation, the storage controller 21(*m*) will retrieve the data from the requested track, use the above-described cache slot replacement list to select a cache slot 31(*s*), load the data into cache slot 31(*s*) and update the track descriptor 36(*c*)(*t*) in the cache index table 32(*d*) associated with the storage device 22 to indicate that the data from the track is in the.cache slot 31(*s*), in particular setting the cached flag 37(*c*)(*t*) and loading a pointer to the cache slot in the cache slot pointer 38(*c*)(*t*).

After the storage controller 21(*m*) has completed the staging operation, it will load a staging completed message in the stage completion list in the cache manager memory 33 associated with the host computer 11(*n*) which issued the staging request, and notify the host computer's cache manager 16(*n*) that a stage completed message has been loaded therein. At some point after receiving the notification, the host computer's cache manager 16(*n*) can repeat the operations performed in connection with the retrieval request as described above, in particular accessing the cache index table 32(*d*) in the cache index directory 32 associated with the storage device 22 in which the data to be retrieved is stored, in particular accessing the track descriptor 36(*c*)(*t*) of the cylinder descriptor 36(*c*) to determine, from the condition of the cached flag 37(*c*)(*t*), whether the data from the track is cached in a cache slot 31(*s*) in the cache memory and, if so, use the cache slot pointer 38(*t*) to identify the particular cache slot 31(*s*) in which the data is cached and retrieve the required data from the cache slot 31(*s*). Since at this point the cached flag 37(*c*)(*t*) should indicate that the data from the track is cached in a cache slot 31(*s*), the host adapter's cache manager 16(*n*) should be able to complete the retrieval operation.

Similar operations occur during a storage operation, in which data in a particular track is updated, with the additional operation of removing the identification of the cache slot 31(*s*) containing data to be updated from the replacement list and loading it into the pending write list. During a storage operation, the cache manager 16(*n*) of the initiating host adapter 24(*n*) will initially access the cache index table 32(*d*) in the cache index directory 32 associated with the storage device 22 in which the data to be updated is stored, in particular accessing the track descriptor 36(*c*)(*t*) of the cylinder descriptor 36(*c*) to determine, from the condition of the cached flag 37(*c*)(*t*), whether the data from the track is cached in a cache slot 31(*s*) in the cache memory. If the cached flag 37(*c*)(*t*) indicates that data from the track is cached in a cache slot 31(*s*), the cache manager 16(*n*) uses the cache slot pointer 38(*t*) to identify the particular cache slot 31(*s*) in which the data is cached and loads the update data into the cache slot 31(*s*). In addition, the host adapter's cache manager 16(*n*) will remove the identification of the selected cache slot 31(*s*) from the replacement list to the pending write list so that the cache slot 31(*s*) will not be re-used until a de-staging operation has been performed in connection with the cache slot 31(*s*).

On the other hand, if the cache manager 16(*n*) determines from the cached flag 36(*c*)(*t*) that the data from the track is not cached in a cache slot 31(*s*), it will generate a stage request to enable the storage controller 21(*m*) for the storage device 22 which maintains the data to be retrieved, load the stage request in the stage request queue for the data store 21(*m*) and notify the storage controller 21(*m*) that a stage request had been loaded in the stage request queue. At some point after receiving the notification, the storage controller 21(*m*) will retrieve the stage request and perform a staging operation in response thereto. In performing the staging operation, the storage controller 21(*m*) will retrieve the data from the requested track, select a cache slot 31(*s*), load the data into cache slot 31(*s*) and update the track descriptor 36(*c*)(*t*) in the cache index table 32(*d*) associated with the storage device 22 to indicate that the data from the track is in the cache slot 31(*s*), in particular setting the cached flag 37(*c*)(*t*) and loading a pointer to the cache slot in the cache slot pointer 38(*c*)(*t*).

After the storage controller 21(*m*) has completed the staging operation, it will load a staging completed message in the stage completion queue in the cache manager memory 33 associated with the host computer 11(*n*) which issued the staging request, and notify the cache manager 16(*n*) that a stage completed message has been loaded therein. At some point after receiving the notification, the cache manager 16(*n*) can repeat the operations performed in connection with the retrieval request as described above, in particular accessing the cache index table 32(*d*) in the cache index directory 32 associated with the storage device 22 in which the data to be retrieved is stored, in particular accessing the track descriptor 36(*c*)(*t*) of the cylinder descriptor 36(*c*) to determine, from the condition of the cached flag 37(*c*)(*t*), whether the data from the track is cached in a cache slot 31(*s*) in the cache memory and, if so, use the cache slot pointer 38(*t*) to identify the particular cache slot 31(*s*) in which the data is cached and retrieve the required data from the cache slog 31(*s*). Since at this point the cached flag 37(*c*)(*t*) should indicate that the data from the tack is cached in a cache slot 31(*s*), the cache manager 16(*n*) should be able to complete the storage operation as described above.

As described above, the data stores' cache managers 23(*m*) also perform de-staging operations using the pending write list to identify cache slots 31(*s*) which contain updated data to be written back to the original storage device 22 and track whose data was cached in the respective cache slots 31(*s*). When a cache slot 31(*s*) is de-staged, since at that point the data in the cache slot 31(*s*) corresponds to the data on the respective storage device 22, the data store's cache manager. 23(*m*) which performs the de-staging operation will remove the cache slot's identification from the pending write list and return it to the replacement list so that the cache slot 31(*s*) can be removed. It will be appreciated, however, that a host computer's cache manager 16(n) may perform a number of retrieval operations and/or storage operations in connection with data in the same cache slot 31(s) after the data in the track cached in the slot has been staged and before it can be de-staged, and so data in a cache slot 31(s) can be updated a number of times before it is de-staged. In addition, it will be appreciated that after a cache slot 31(s) has been de-staged, it may also be updated during a storage operation before the cache slot 31(s) is re-used during a staging operation. When that occurs however, since, as described above, the host computer's cache manager 16(m) removes the cache slot's identification from the replacement list and placed it on the write pending list as part of the storage operation, the cache slot 31(s) will be subject to another de-staging operation before it can be re-used. Thus, a particular cache slot 31(s) may be subject to de-staging a number of times with data cached for the same storage device 22, cylinder and track, without being reused.

Figure 3:
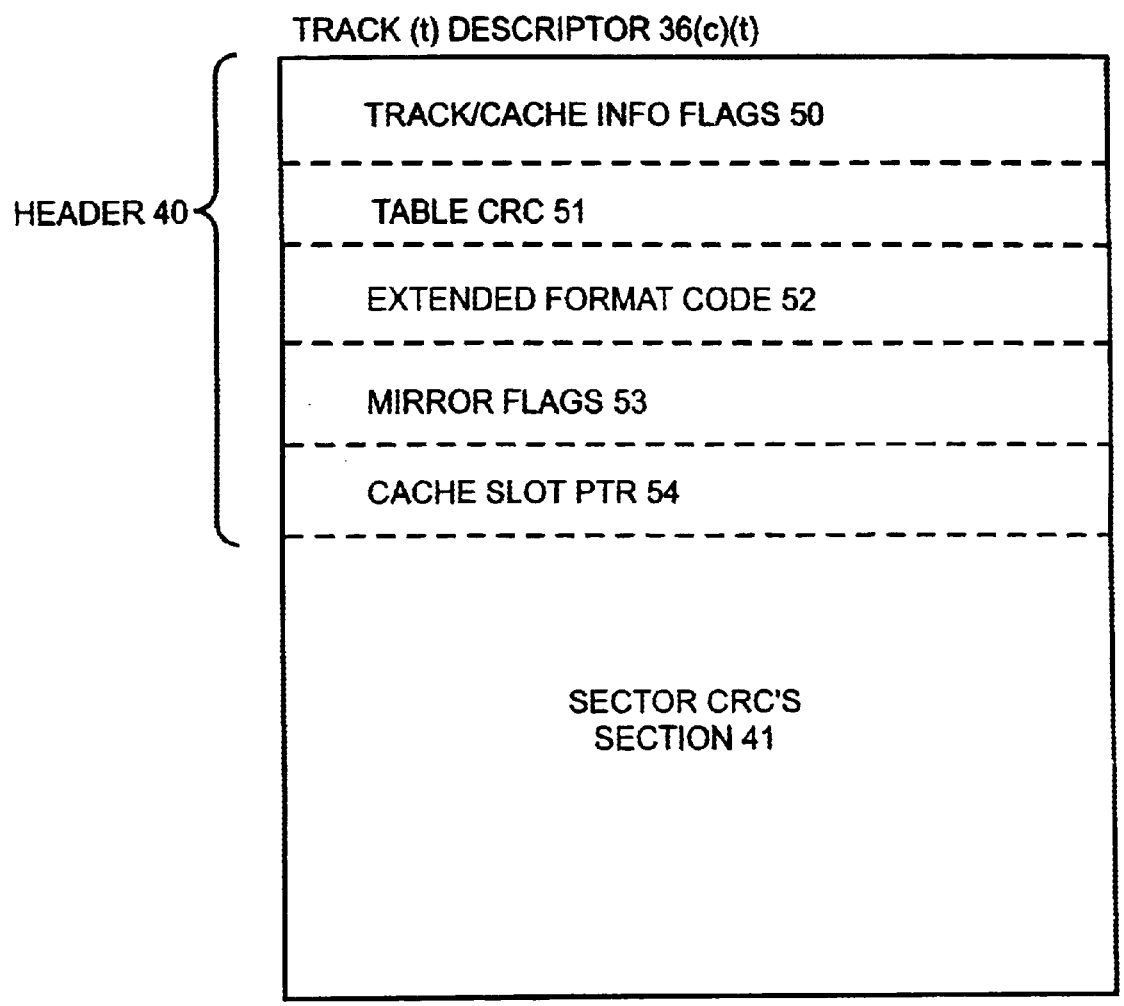
FIG. 3 depicts the structure of a descriptor, useful in the cache memory depicted in FIG. 2, the descriptor providing formatting information for information stored by the'storage subsystem.

The invention provides an arrangement for compactly providing track descriptor information in the respective track descriptors 36(c)(t) (FIG. 2), to efficiently accommodate use of storage devices 22 which can store relatively high-density data and reduce the amount of information which would otherwise need to be stored. FIG. 3 depicts the structure of a track descriptor, identified by reference numeral 36(c)(t), for use in connection with one embodiment of the invention.

With reference to FIG. 3, the track descriptor 36(c)(t) includes a header 40 and a sector CRC section 41. The header 40 includes information about the track, including such information as whether the track is cached in the cache memory 31 and, if so, a pointer to the cache slot 31(s) in which the track is cached. In addition, the header 40 indicates whether mirror copies exist for the track on other digital data storage systems. The sector CRC section 41, on the other hand, contains record-specific CRC information for the respective records in the track. In one embodiment, the records are of fixed-length, such as one or more blocks or sectors (generally referred to as "sectors"), and each track comprises a predetermined number of such sectors.

More specifically, the header 40 includes a number of flags and fields as shown in FIG. 3, including a track/cache information flags field 50, a table CRC field 51, an extended format code field 52, a mirror flags records flag 53, and a cache slot pointer field 54. The track/cache information flags field 50 includes several flags (not separately shown), including a track in cache flag (which corresponds to the cached flag 37(c)(t) described above in connection with FIG. 2), a prefetched track flag, a track write pending flag, and a permanently cached track flag, all of which are used in managing caching in connection with the track. The track in cache flag, if set, indicates that the track is currently cached in the cache memory 31; when that occurs, the cache slot pointer field 54 (which corresponds to the cache slot pointer 38(c)(t) described above in connection with FIG. 2) contains a pointer that identifies the cache slot 31(s) in which the track is cached. The prefetched track flag, if set, indicates that the data store's cache manager 23(m) prefetched the track and loaded it in the cache memory 31 before it was requested to do so by a host adapter's cache manager 25(n). Generally, a cache manager 23(m) may prefetch a particular track if a host adapter's cache manager 25(n) initiates a series of staging operations for a series of preceding tracks, which can indicate that the program being processed by the associated host computer 11(n) will likely also request that the particular track be staged.

The permanently cached track flag of the track/cache information flags field 50 is set if the track is to be permanently cached in a cache slot 31(s) and not to be overwritten. A host computer's cache manager 25(n) may request that a track be permanently cached if the program being processed by the associated host computer is expected to access the records in the track frequently.

The track write pending flag is used to indicate that the information in the track has been updated by a host computer 11(n) and needs to be de-staged by a data store 20(m). While the write pending flag is set, to indicate that a de-staging operation is to be performed, the cache slot 31(s) in which the track is cached will not be used for another track until the de-staging operation has been completed. It will be appreciated that, if the permanently cached track flag is also set, after the destaging operation the cache slot 31(s) will not be used for another track, but instead the track will remain in the cache slot 31(s) as long as the permanently cached track flag is set.

The table CRC field 51 of the track descriptor 36(c)(t) stores a CRC value that corresponds to the cyclical redundancy check ("CRC") value for the track descriptor 36(c)(t). The CRC value can be generated from the information in the other fields 50, and 52–54 and the sector CRC's section 41 using any convenient CRC algorithm, and can be used to verify the information in those fields 50 and 52–54 and that section 41.

The extended format code field 52 can be used to provide formatting information for each data item stored in the track associated with the track descriptor 36(c)(t), if the data is stored in a format in addition to the fixed-sector storage format.

The mirror flags field 53 contains one or more flags indicating whether the track has been mirrored on one or more other digital data storage subsystems, and, if so, whether the mirrors are up-to-date. In one embodiment, the digital data storage subsystem 12 is one of four in a cluster of digital data storage subsystems which serves to provide mirrors for each other, and the flags in the mirror flags field 53 indicates both on which of the digital data storage subsystems the track is mirrored, and the update status of the track on each of those digital data storage subsystems. The digital data storage subsystem can use the mirror flags 53 to verify that, if a track is mirrored, all of the mirrors are maintained in an updated and synchronous condition.

Figure 4:
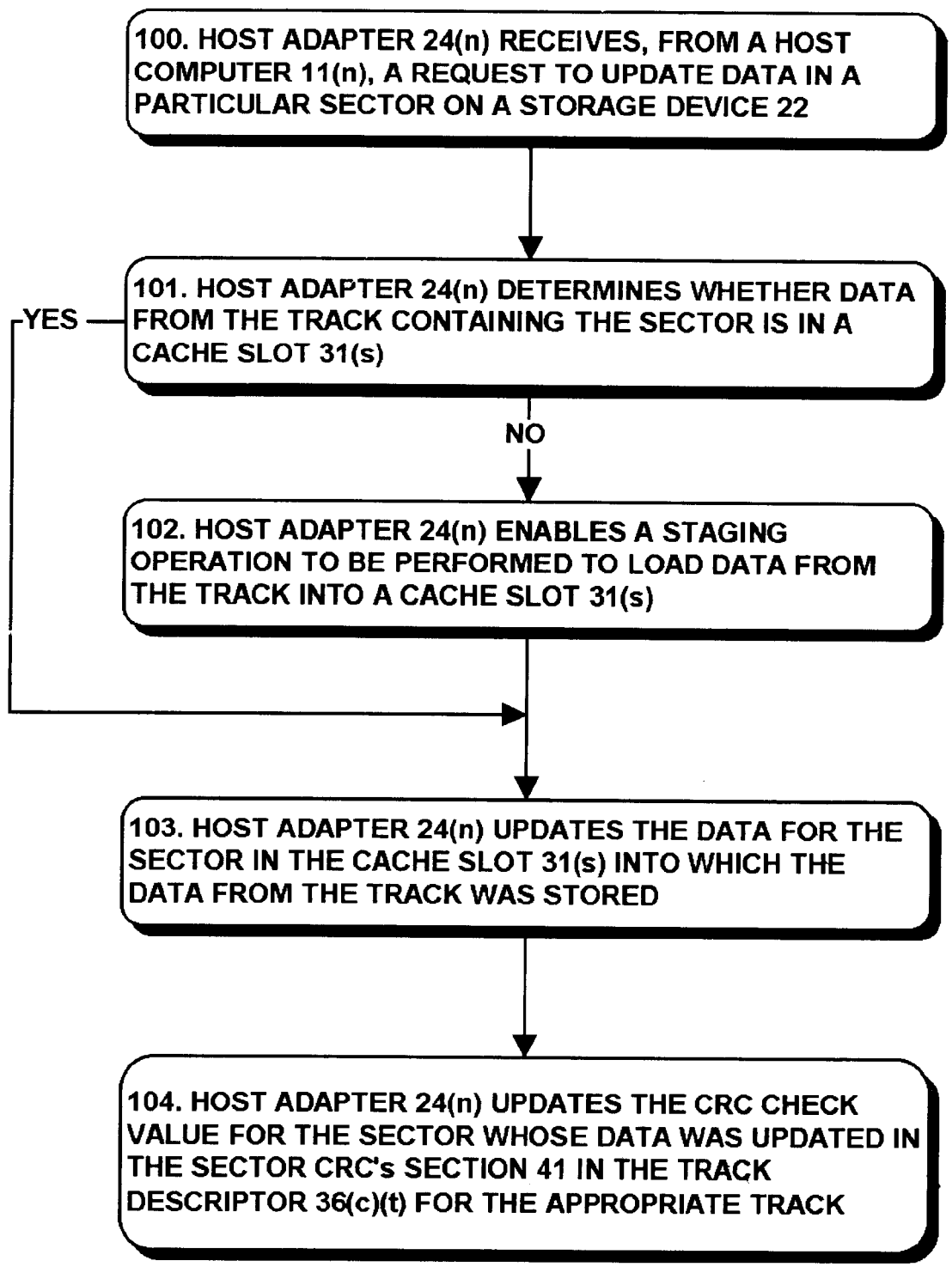
FIG. 4 is a flow chart depicting operations performed by a host adapter, depicted on FIG. 1, following receipt of a storage request.
Figure 5:
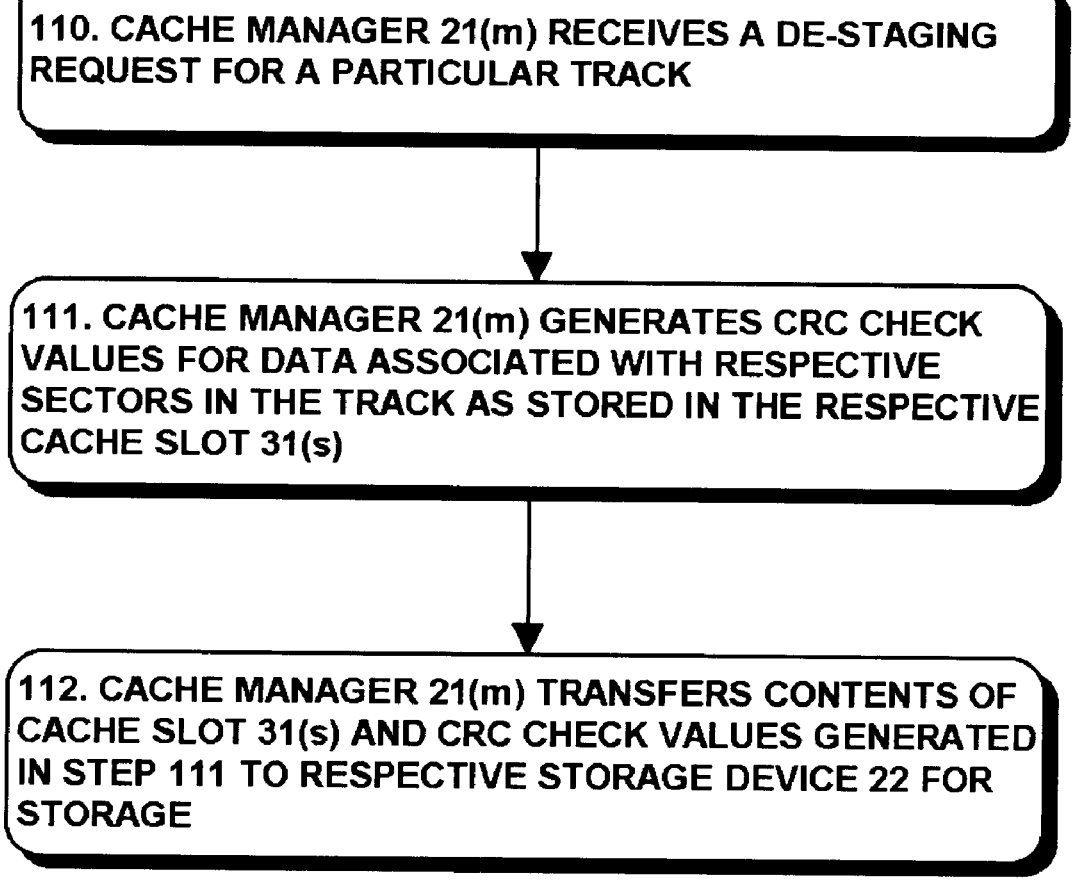
FIG. 5 is a flow chart depicting operations performed by a cache manager, depicted on FIG. 1, during a destaging operation.
Figure 6:
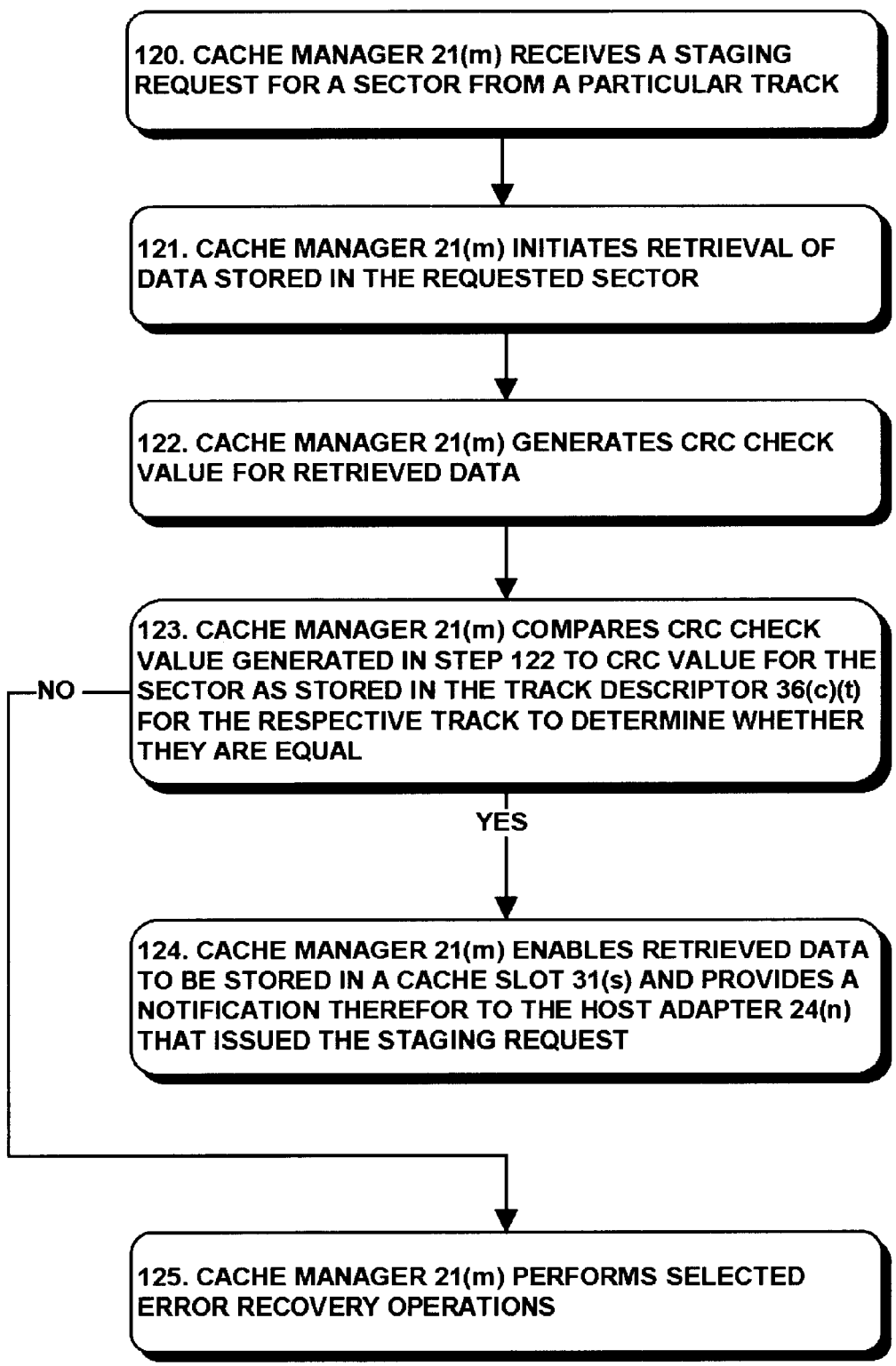
FIG. 6 is a flow chart depicting operations performed by a cache manager during a staging operation.

The sector CRC's section 41 contains, for each sector on the track associated with the track descriptor 36(c)(t), a sector CRC value for the sector generated using any convenient CRC algorithm. In one embodiment, each CRC value as stored in sector CRC's section 41 will be on the order of one byte, and, if the CRC algorithm used to generate the respective CRC value would normally generate a multi-byte CRC value, one of the bytes may be used in the sector CRC's section 41, or the various bytes may be combined by, for example, adding the values represented by the bytes to form a single byte. Generally, each sector as stored on the respective storage devices 22 will also have a CRC value stored therewith, which should conform to the CRC value as stored in the sector CRC's section 41, and the cache managers 23(m), in particular, can use the CRC value as stored in the sector CRC's section 41 during a staging operation, in which data is transferred from the storage device to the cache memory 31 to verify that the sector to be staged is the correct sector and that the data stored in the sector is correct. If a host adapter 24(n) updates data for a sector in a track, it will update the CRC value for the track as stored in the sector CRC's section 41 to conform to the appropriate CRC value for the updated data in the sector; in that operation, the host adapter 24(n) will use the same CRC generation algorithm that is used in generating the CRC value for the data as stored on the respective storage device. In addition, if a cache manager 23(m) de-stages a sector, which, as noted above, may occur if the data in the sector has been updated, a new CRC value will be generated for the data for storage with it in the sector. FIG. 4 is a flow chart depicting operations performed by a host adapter 24(n) in connection with receipt of a storage request and FIGS. 5 and 6 are flow charts depicting operations performed by a cache manager 21(n) in connection with de-staging and staging operations, respectively.

The invention provides a number of advantages. In particular, it provides a digital data storage subsystem in which formatting information for the various tracks can be efficiently stored, to efficiently accommodate formatting information for records stored on storage devices 22 whose tracks can each store large amounts of information in large numbers of records, without requiring correspondingly large track descriptors 36(c)(t).

It will be appreciated that a number of modifications may be made to the digital data storage subsystem as described above in connection with FIGS. 1 through 3. For example, although the storage subsystem 12 has been described as being connected to a plurality of host computers 11(n), it will be appreciated that the storage subsystem may be.used only in connection with a single host computer 11(n). In addition, although the storage subsystem 12 has been described as including a plurality of data stores 20(m) and a plurality of storage devices 22, it will be appreciated that the storage subsystem 12 may be provided with a single data store and a single storage device.

It will be appreciated that a system in accordance with the invention can be constructed in whole or in part from special purpose hardware or a general purpose computer system, or any combination thereof, any portion of which may be controlled by a suitable program.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital data storage system comprising:
    at least one storage element, the storage element comprising a plurality of storage locations each configured to retrievably store a record, the at least one storage element being configured to retrievable store a series of records;
    a memory configured to store, associated with each storage location, a descriptor, the descriptor having a check value for the record stored in the respective storage location associated with the device, said memory being configured to store, associated with the descriptor associated with said at least one of said storage elements, a descriptor having a series of check values each associated with a respective one of said plurality of records,
    a control device configured to
        i. initiate retrieval of one of said records in response to receipt of a retrieval request requesting retrieval of one of said records from one of said storage locations, and,
        ii. after said one of said records has been retrieved in response to the request, use the check value from the descriptor associated with the storage location identified in the retrieval request to verify that the one of said records is from the one of said storage locations identified in the retrieval request, and
    a cache memory comprising a plurality of cache slots,
    the control device being configured to, after retrieving said one of said records, store the record in one of the cache slots and store a pointer thereto in said descriptor,
    after retrieving a respective one of said series of records from said at least one of said storage elements in response to a retrieval request for the respective one of said series of records, use the respective one of the series of check values associated with the respective one of said series of records from the descriptor associated with said at least one storage location, to verify that the one of said records is the respective one of the series of records stored in the one of said storage locations identified in the retrieval request, and
    based on the determination that the one of said records is the respective one of the series of records stored in the one of said storage locations identified in the retrieval request, selectively store the one of said records in a selected one of said cache slots, the control device being configured to select the one of said cache slots so that a plurality of records from the same storage element are stored in the same cache slot.

2. A digital data storage system as defined in claim 1, the control device being further being configured to, if one of said records stored in one of said storage locations is updated, generate a check value for said one of said records and store the generated descriptor associated with said one of said storage locations.

3. A digital data storage system as defined in claim 1, in which said control device is further configured to, if one of said records stored in one of said cache slots is updated, generate an updated check value for said record and store the updated check value in the descriptor in said memory associated with the one of said records.

4. A method of operating a digital data storage system, the digital data storage system comprising at least one storage element, the storage element comprising a plurality of storage locations each configured to retrievably store a record, and a memory configured to store, associated with each storage location, a descriptor, the descriptor having a check value for the record stored in the respective storage location associated with the descriptor, the digital data storage system further comprising a cache memory comprising a plurality of cache slots said memory being configured to store, associated with the descriptor associated with said at least storage element, a descriptor having a series of check values each associated with a respective one of said series of records, said cache memory comprising, the method comprising the steps of in response to a retrieval request requesting retrieval of a record from one of said storage locations, initiating retrieving said record, after retrieving said record, storing the record in one of the cache slots and storing a pointer thereto in said descriptor using the check value from the descriptor associated with the storage location identified in the retrieval request to verify that the record is from the one of said storage locations identified in the retrieval request, after retrieving a respective one of said series of records from said at least one of said storage elements in response to a retrieval request for the respective one of said series of records, using the respective one of the series of check values associated with the respective one of said series of records from the descriptor associated with said at least one storage location, to verify that the one of said records is the respective one of the series of records stored in the one of said storage locations identified in the retrieval request, and based on the determination that the one of said records is the respective one of the series of records stored in the one of said storage locations identified in the retrieval request, storing the one of said records in a selected one of said cache slots, the selection being made such that a plurality of records from the same storage element are stored in the same cache slot.

5. A method as defined in claim 4, further comprising the step of, if said record stored in one of said storage locations is updated, generating a check value for said record and storing the generated check value in said memory in the descriptor associated with said one of said storage locations.

6. A method as defined in claim 4, said method comprising the steps of, if one of said records stored in one of said cache slots is updated, generating an updated check value for said record and storing the updated check value in the descriptor in said memory associated with the one of said records.

* * * * *